Sept. 2, 1930.  E. J. DOHERTY  1,774,916
BUMPER BAR
Filed Sept. 27, 1929
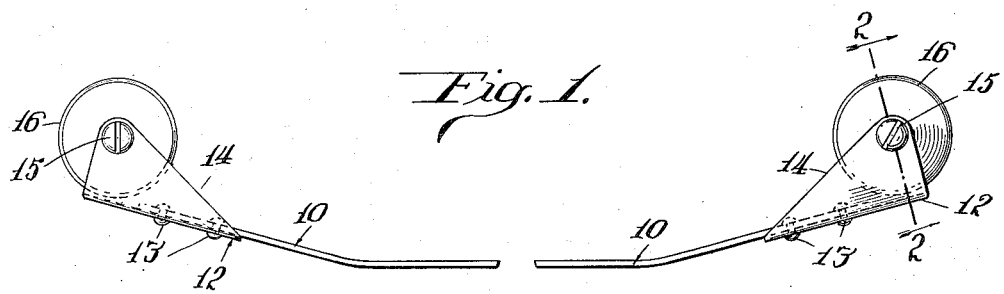
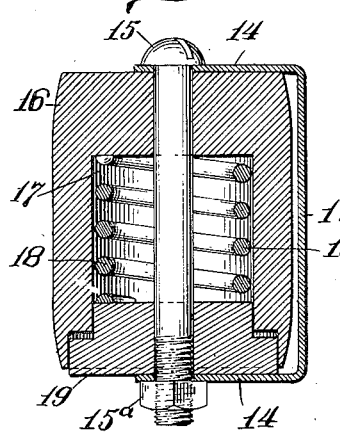
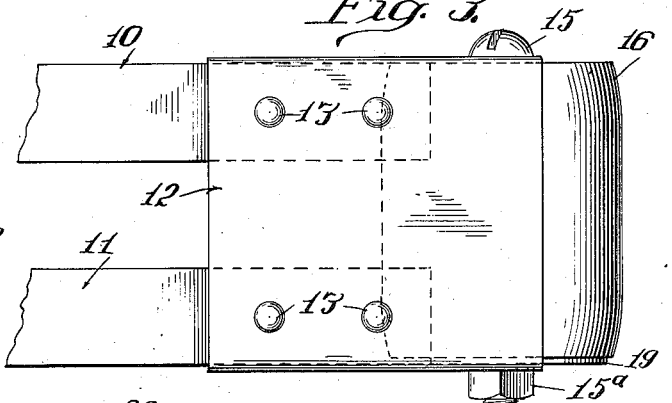
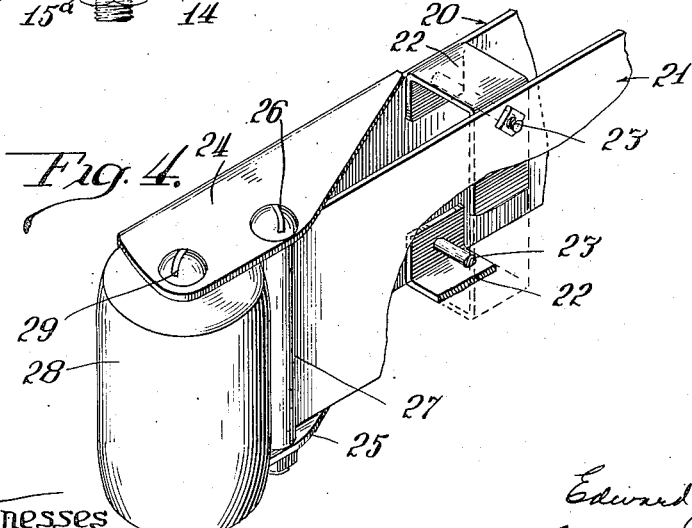
Inventor
Edward J. Doherty,
By George Heidman
Attorney
Witnesses
Milton Lenoir
F. A. Florell Patented Sept. 2, 1930

1,774,916

UNITED STATES PATENT OFFICE

EDWARD J. DOHERTY, OF CHICAGO, ILLINOIS

BUMPER BAR

Application filed September 27, 1929. Serial No. 395,480.

My invention relates to bumpers especially intended for use on automobiles; and has for its object the provision of a structure with a yielding element or portion at the ends of the bumper so as to provide a bumper adapted to prevent the tendency of interlocking between the bumpers of different automobiles operating in too close proximity with each other.

The invention also contemplates a structure whereby the contacting bumper of an automobile will be caused to move away from the ends of the bumper when the ends of the bumpers of two automobiles are brought in striking relation with each other.

The objects and advantages of my invention will be readily comprehended from the following detailed description of the accompanying drawing, wherein:—

Figure 1 is a plan view of the ends of an automobile bumper provided with my invention; the intermediate portion of the bumper being broken away.

Figure 2 is a detail sectional view taken on the line 2—2 of Figure 1, looking in the direction of the arrows.

Figure 3 is an elevational view of one end of the bumper illustrated in Figure 1.

Figure 4 is a perspective view of one end of a bumper, showing a modification of the invention.

In the first three figures of the drawing, I show an exemplification of my invention as applied to the ends of an automobile bumper consisting of the usual two parallelly arranged bars 10, 11, disposed one above the other in spaced relation.

The ends of the bars are provided with a bracket member or plate 12 which is rigidly secured to the bumper bar or bars, as for example by the rivets 13. The bracket 12 in its specific exemplification is shown of vertical width sufficient to receive two bumper bars 10 and 11, but it will be understood that the width of bracket 12 is in keeping with the type of bumper employed; that is to say, the bracket would be narrower if a single bar is employed, and would be wider if three or more bars are employed. The bracket 12, with a multiple bar bumper, constitutes a reenforcement for the bars and also provides means for holding them together at the ends.

The bracket or plate 12 is provided at top and bottom with the rearwardly bent flanges or wings 14, 14, which are preferably tapered from the outer end toward the inner end of the bracket as shown more clearly in Figure 1.

The outer rear ends of the tapered wings 14, 14 are apertured to receive the bolt or pin 15 which extends through both top and bottom wings 14, 14 and is shown provided at its lower end with a nut 15ª for holding the pin or bolt 15 in place.

The pin or bolt 15 constitutes means for rotatably holding a roller 16 in place between the wings 14; the roller being free to rotate on the pin or bolt 15.

In the particular exemplification of the invention as shown in Figure 2, the roller 16 is shown provided with an axial socket 17 adapted to receive a coiled spring 18, disposed about the pin or bolt 15; and the end of the socket 17 is closed by a cap or closure member 19 which preferably is arranged to fit flush with the end of the roller as shown in Figure 2. In order to prevent free ingress of moisture, the open end of the socket 17 is preferably on the bottom of the roller 16.

It is apparent that the spring 18 will be held under compression when the washer or cap member 19 is in place; the spring tending to force the roller proper upwardly and the cap or washer member 19 downwardly, thus maintaining said elements in snug relation with the wings 14, 14 of the bracket and thus prevent vibration or chatter.

It is understood, of course, that the cap or washer member 19 is apertured for passage of the holding pin or bolt 15.

The brackets 12 are to be made of sufficiently strong material or metal to withstand more or less force, and the rollers 16 may be of any suitable hard material, such as wood or metals to withstand blows and are to be of a diameter sufficient to extend beyond the ends of the brackets 12 and therefore also beyond the ends of the bumper as well as rearwardly beyond the ears or wings 14 of the brackets 12, as shown in Figure 1. With the rotatably mounted members or rollers 16 extending beyond the ends of the bumper bars, it is evident that contact between the bumper proper of adjacent substantially parallel cars will be impossible, as such contact will be with the yielding or rotatably mounted rollers, thus causing the bumpers of the offending automobile to roll off—the pulling force causing the rollers to rotate and thereby tend to force the bumpers away from each other.

The spring 18 has no direct connection with the roller 16 and therefore in no way interfers with its free rotation, but merely acts as a cushioning element to prevent chatter of the loose elements during automobile operation.

It is apparent from this construction that in the event of the bumper of an approaching automobile coming into contact with either end of the bumper provided with my invention interlocking of the bumpers is not likely, but on the other hand the rotatable element or roller will move about its axis.

This will induce the offending bumper to roll off or away from the end of the bumper because of the rotating or yielding elements without causing damage to the bumper.

In Figure 4 I illustrate a modified form of my invention which is of size for application to a bumper of the single bar type, namely a bumper composed of one longitudinal bar, although equally applicable to a bumper having a number of bars arranged one above the other.

This modification comprises a pair of parallel horizontally spaced bars 20, 21, which may constitute the bars of the bumper proper, or these bars 20 and 21 may be riveted or otherwise secured to the ends of the main bars of the bumper, with the bumper bars arranged between the two parallel bars 20, 21.

The bars 20 and 21 are shown reenforced and held in spaced relation, especially where they constitute the main bars of the bumper, by the angular bracket 22, which may be riveted or rigidly secured between the bars 20 and 21 by suitable bolts as shown at 23 in Figure 4.

The outer end of the bars is provided with the rearwardly extending wings 24, 25 at top and bottom; the wings 24, 25 being of transverse width sufficient to span the distance between the two bars 20 and 21 so as to permit the outer end of the bar 21 to be secured by means of the pin or bolt 26, which passes through both wings 24, 25 and preferably through the outer curled end 27 of the inner or rear bar 21 as shown.

The wings 24, 25 are also of a size sufficient to receive the roller 28 therebetween and permit free rotation of the latter about its holding spindle or bolt 29 which passes axially through the roller and also through the lower wing 25, being held in place by a nut or in any other suitable manner.

Where the bar 20 constitutes the main or outer bar of the bumper proper, the winged end portion may be a separate bracket as in Figure 1 and the bracket riveted or rigidly secured to ends of the bumper bars, which need not be curved backwardly as in present bumper construction, but allowed to extend in a straight plane, thus causing the rollers to be more effective and an interlocking of bumpers impossible, such interlocking, however, being true with bumpers as at present constructed.

By employing the double bar construction shown in Figure 4, whether the bars 20 and 21 constitute the bumper bars proper or are attached to the ends of the bumper bars, a stronger construction is provided, especially at the ends where improper contact with bumpers occurs; while at the same time contact between the bumpers of two oppositely moving automobiles provided with my bumpers will make interlocking impossible and will cause the two bumpers to roll off or away from each other as is evident from the construction.

As is apparent, with my invention the frequent interlocking of bumpers, especially if the bars are constructed as shown in Figure 4, is less likely to occur; while the tearing loose or bending of bumpers will to a considerable extent be obviated because of the yielding or movable elements arranged at the outer ends of the bumpers; and while I believe the constructions shown to be the simplest adaptations of the invention, modifications may be made without, however, departing from the spirit of my invention.

What I claim and wish to secure by Letters Patent is:

1. In automobile bumpers provided with horizontally disposed bars, rollers pivotally mounted on the outer ends of the bars so as to extend beyond the ends of the bars and to rotate horizontally, and means for yieldingly holding the rollers against vibration.

2. An automobile bumper having a horizontally disposed bar, brackets secured to the outer ends of the bar and having transversely disposed wing portions, rollers rotatably mounted between said wing portions so as to extend beyond the outer ends of the brackets, and yielding means adapted to yieldingly hold the rollers against vibration.

3. In an automobile bumper, a pair of parallel bars arranged in horizontal spaced relation and provided at the ends with transversely disposed wing portions at the upper and lower edges whereby rigid connection between the bars may be provided, and rotatable elements mounted between the outer ends of the wing portions so as to have the perimeters of the elements extend beyond the ends of the bars.

4. In an automobile bumper, a pair of parallel bars arranged in horizontal spaced relation, and rollers rotatably mounted at the outer ends of the bars so as to rotate horizontally with the perimeters of the rollers extending beyond the ends of the bars.

5. An automobile bumper provided with a pair of horizontally spaced bars, means for holding said bars in spaced relation, and horizontally rotating rollers mounted at the outer ends of the bars with their perimeters extending beyond the outer ends of the bars.

EDWARD J. DOHERTY.